US012739740B2

(12) United States Patent
Ueura et al.

(10) Patent No.: US 12,739,740 B2
(45) Date of Patent: Sep. 15, 2026

(54) INFORMATION PROCESSING DEVICE, TERMINAL DEVICE, INFORMATION PROCESSING METHOD, AND INFORMATION PROCESSING PROGRAM

(71) Applicant: Sony Group Corporation, Tokyo (JP)

(72) Inventors: Daichi Ueura, Tokyo (JP); Koki Horita, Tokyo (JP); Toshiya Ikenaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 356 days.

(21) Appl. No.: 18/683,794

(22) PCT Filed: Mar. 14, 2022

(86) PCT No.: PCT/JP2022/011167
§ 371 (c)(1),
(2) Date: Feb. 15, 2024

(87) PCT Pub. No.: WO2023/026541
PCT Pub. Date: Mar. 2, 2023

(65) Prior Publication Data

US 2024/0373334 A1 Nov. 7, 2024

(30) Foreign Application Priority Data

Aug. 26, 2021 (JP) ................................ 2021-138076

(51) Int. Cl.
*H04W 48/18* (2009.01)
*H04W 48/02* (2009.01)
*H04W 48/16* (2009.01)

(52) U.S. Cl.
CPC .......... *H04W 48/18* (2013.01); *H04W 48/02* (2013.01); *H04W 48/16* (2013.01)

(58) Field of Classification Search
CPC ..... H04W 48/18; H04W 84/12; H04W 12/06; H04W 36/08; H04W 48/14; H04W 48/16;
(Continued)

(56) References Cited

U.S. PATENT DOCUMENTS 9,148,846 B2 9/2015 Niass
10,285,110 B2 5/2019 Cui
(Continued)

FOREIGN PATENT DOCUMENTS

JP 2001-069060 A 3/2001
JP 2004-080707 A 3/2004
(Continued)

OTHER PUBLICATIONS

"Reconfigurable Radio Systems (RRS); Feasibility Study on Control Channels for Cognitive Radio Systems", Apr. 2012 (Apr. 1, 2012), XP014069746.
(Continued)

*Primary Examiner* — Timothy X Pham
(74) *Attorney, Agent, or Firm* — XSENSUS LLP

(57) ABSTRACT

An information processing device includes an acquisition unit and a control unit. The acquisition unit acquires a plurality of pieces of network request information individually transmitted from a plurality of terminal devices used by a user, and acquires communication information indicating statuses of a plurality of communication networks usable by the plurality of terminal devices. The control unit controls the communication network to be used by each terminal device in accordance with a plurality of pieces of network request information and the communication information.

10 Claims, 8 Drawing Sheets

(58) Field of Classification Search

CPC ............. H04W 48/20; H04W 52/0219; H04W 12/069; H04W 40/08; H04W 52/0245; H04W 76/10; H04W 88/04; H04W 48/06; H04W 8/183; H04W 12/04; H04W 36/22; H04W 76/11; H04W 8/205; H04W 12/08; H04W 12/43; H04W 28/0247; H04W 48/08; H04W 48/12; H04W 28/18; H04W 4/02; H04W 48/10; H04W 74/00; H04W 76/18; H04W 8/20; H04W 8/22; H04W 24/04; H04W 36/32; H04W 48/02; H04W 52/0229; H04W 52/0235; H04W 60/00; H04W 64/00; H04W 68/025; H04W 72/00; H04W 72/02; H04W 72/121; H04W 72/542; H04W 76/19; H04W 8/005; H04W 88/06; H04W 12/35; H04W 12/77; H04W 24/02; H04W 28/06; H04W 36/0033; H04W 36/0083; H04W 36/008357; H04W 36/00837; H04W 36/1446; H04W 36/26; H04W 36/304; H04W 36/324; H04W 4/021; H04W 4/029; H04W 4/06; H04W 4/20; H04W 4/24; H04W 4/60; H04W 4/80; H04W 60/04; H04W 68/00; H04W 68/005; H04W 72/30; H04W 72/566; H04W 74/0833; H04W 76/12; H04W 76/22; H04W 76/32; H04W 76/34; H04W 8/02; H04W 8/06; H04W 8/18; H04W 8/24; H04W 8/26; H04W 84/042; H04W 88/08; Y02D 30/70; H04L 63/0823; H04L 12/2856; H04L 12/1428; H04L 41/08; H04L 63/08; H04L 63/083; H04L 63/0853; H04L 67/52; H04B 17/327; G06F 3/1204; G06F 3/1226; G06F 3/1286; G06F 3/1288; G06F 3/1292; G06K 19/06037; G06Q 30/04; H04M 1/00; H04M 15/765; H04M 15/7652; H04M 15/7655; H04M 15/80; H04M 15/8011

See application file for complete search history.

(56) References Cited

U.S. PATENT DOCUMENTS

| | | | | |
|---|---|---|---|---|
| 2011/0317621 | A1* | 12/2011 | Nagasawa ............. | H04W 48/18<br>370/328 |
| 2021/0195039 | A1* | 6/2021 | Tomita ............... | H04N 1/00214 |
| 2022/0053504 | A1* | 2/2022 | Wodrich ............... | H04W 72/56 |

FOREIGN PATENT DOCUMENTS

| | | | |
|---|---|---|---|
| JP | 2009-094954 | A | 4/2009 |
| JP | 2013-219438 | A | 10/2013 |
| WO | 2014/034255 | A1 | 3/2014 |

OTHER PUBLICATIONS

International Search Report and Written Opinion mailed on May 17, 2022, received for International Patent Application No. PCT/JP2022/011167, filed on Mar. 14, 2022, 06 pages including English Translation.

* cited by examiner

| BEARER NAME | AVERAGE BANDWIDTH | TRAFFIC CHARACTERISTIC | LATENCY |
|---|---|---|---|
| 5G mmW | 10Gbps | unstable | 2ms |
| 5G Sub6 | 100Mbps | stable | 10ms |
| 4G LTE | 10Mbps | stable | 100ms |

3
A
5
2
4
5
5
Wi-Fi
5G Sub6
5G mmW
LTE
Wi-Fi
Wi-Fi
5G mmW
5G Sub6
Wi-Fi
3
5
B
2
LTE
5G Sub6
5G mmW
Wi-Fi

| CLIENT ID | CURRENT BEARER NAME | REQUESTED BANDWIDTH | REQUESTED TRAFFIC CHARACTERISTIC | LATENCY | PRIORITY |
|---|---|---|---|---|---|
| 1 | 5G mmW | 1000Mbps | unstable | 2ms | 8 |
| 2 | 5G Sub6 | 100Mbps | stable | 10ms | 6 |
| 3 | 4G LTE | 10Mbps | stable | 100ms | 0 |

INFORMATION PROCESSING DEVICE, TERMINAL DEVICE, INFORMATION PROCESSING METHOD, AND INFORMATION PROCESSING PROGRAM

CROSS-REFERENCE TO RELATED APPLICATIONS

This application is a national stage application, pursuant to 35 U.S.C. § 371, of International Patent Application No. PCT/JP2022/011167, filed Mar. 14, 2022, which claims priority from Japanese Patent Application No. 2021-138076, filed Aug. 26, 2021, the entire contents of each are incorporated herein by reference.

FIELD

The present disclosure relates to an information processing device, a terminal device, an information processing method, and an information processing program.

BACKGROUND

Conventionally, a plurality of communication networks such as 5G (sub6), 5G (mmW), 4G (LTE), and Wi-Fi (registered trademark) may be usable depending on a terminal device used by a user. Patent Literature 1 discloses a technique of selecting an access point to be connected depending on the communication quality.

CITATION LIST

Patent Literature

Patent Literature 1: WO 2014/034255 A

SUMMARY

Technical Problem

However, the technique of Patent Literature 1 has a problem that, although an access point can be selected according to the communication quality of each terminal device, it is not possible to select a communication network to be used by each terminal device in consideration of a use status of each communication network by a plurality of terminal devices. In addition, there has been no sufficient consideration of differences in network capacity and network characteristics requested by each terminal device, or moving statuses of the terminal devices. For example, in an event of a stadium, terminal equipment such as a camera used for shooting a moving image for broadcasting, a camera that captures an image (photograph), and a smartphone of a general audience is used, and a network capacity, network characteristics, and a moving status of the terminal device requested by each terminal equipment are different. However, it has been difficult to set each terminal device to use an appropriate communication network.

In view of this, the present disclosure proposes an information processing device, a terminal device, an information processing method, and an information processing program capable of appropriately selecting a communication network to be used by each terminal device in a case where a plurality of terminal devices can use a plurality of communication networks.

Solution to Problem

In order to solve the above problem, an information processing device according to one embodiment of the present disclosure includes: an acquisition unit that acquires a plurality of pieces of network request information individually transmitted from a plurality of terminal devices used by a user and acquires communication information indicating statuses of a plurality of communication networks usable by the plurality of terminal devices; and a control unit that controls the communication network to be used by each terminal device in accordance with the plurality of pieces of network request information and the communication information.

DESCRIPTION OF EMBODIMENTS

Figure 1:
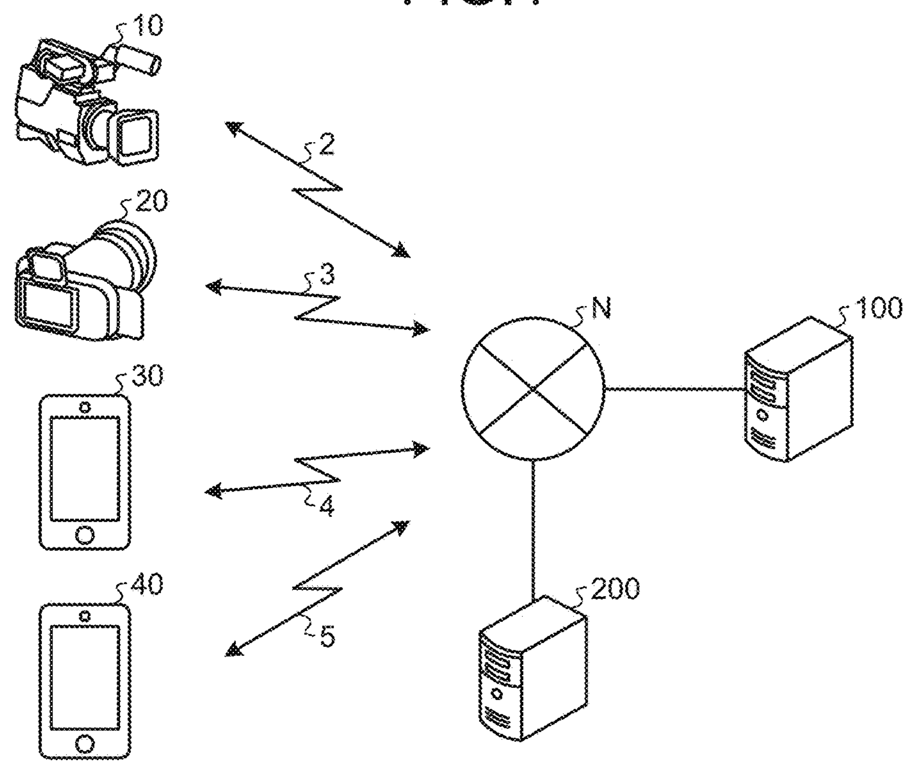
FIG. 1 is a diagram illustrating a configuration example of an information processing system according to an embodiment.

Embodiments of the present disclosure will be described below in detail with reference to the drawings. In each of the following embodiments, the same parts are denoted by the same reference numerals, and a repetitive description thereof will be omitted.

Moreover, in the present specification and the drawings, a plurality of components having substantially the same functional configuration will be distinguished by attaching different numbers after the same reference numerals. However, when it is not particularly necessary to distinguish between the plurality of components having substantially the same functional configuration, only the same reference numeral is given.

Note that the description will be provided in the following order.

1. Configuration of information processing system
2. Configuration of terminal device
3. Configuration of information processing device
4. Processing of information processing device: Part 1
5. Processing of information processing device: Part 2
6. Processing of information processing device: Part 3
7. Processing of information processing device: Part 4
8. Case where network capacity is insufficient 8-1. Case where total network capacity is insufficient 8-2. Case where network bandwidth of specific bearer is insufficient
9. First modification
10. Second modification
11. Third modification
12. Hardware configuration
13. Others 1. Configuration of Information Processing System FIG. 1 is a diagram illustrating a configuration example of an information processing system according to an embodiment. As illustrated in FIG. 1, an information processing system 1 includes terminal devices 10 to 40, an information processing device 100, and an external server 200. The terminal devices 10 to 40, the information processing device 100, and the external server 200 are communicably connected to each other by a wired or wireless connection via a predetermined communication network. FIG. 1 illustrates an example of a communication network that enables use of a network N being an Internet channel, 5G (Sub6) 2, 5G (mmW) 3, 4G (LTE) 4, and Wi-Fi 5. Note that the information processing system 1 may include a plurality of each of the terminal devices 10 to 40, a plurality of information processing devices 100, and a plurality of external servers 200.

The terminal devices 10 to 40 are information processing devices each used by a user. The terminal devices 10 to 40 may be any device capable of implementing the processing in the embodiment. Furthermore, the terminal devices 10 to 40 may each be a device such as a communicable image shooting device, communicable imaging equipment, a smartphone, a tablet terminal, a laptop PC, a desktop PC, a mobile phone, or a PDA. The example illustrated in FIG. 1 illustrates a case where the terminal device 10 is an image shooting device to shoot a moving image, the terminal device 20 is imaging equipment that captures a still image, and the terminal devices 30 and 40 are smartphones.

The information processing device 100 is used to control a communication network used by the terminal devices 10 to 40. The information processing device 100 is, for example, an information processing device such as a PC or a work station (WS), and performs processing based on information transmitted from the terminal devices 10 to 40 via the network N. The information processing device 100 controls a communication network used by the terminal devices 10 to 40 based on network (hereinafter, also referred to as NW) request information and communication information from the terminal devices 10 to 40.

The external server 200 is, for example, an information processing device such as a PC or a work station (WS), and is used to provide information such as user attribute to the information processing device 100.

2. Configuration of Terminal Device

Figure 2:
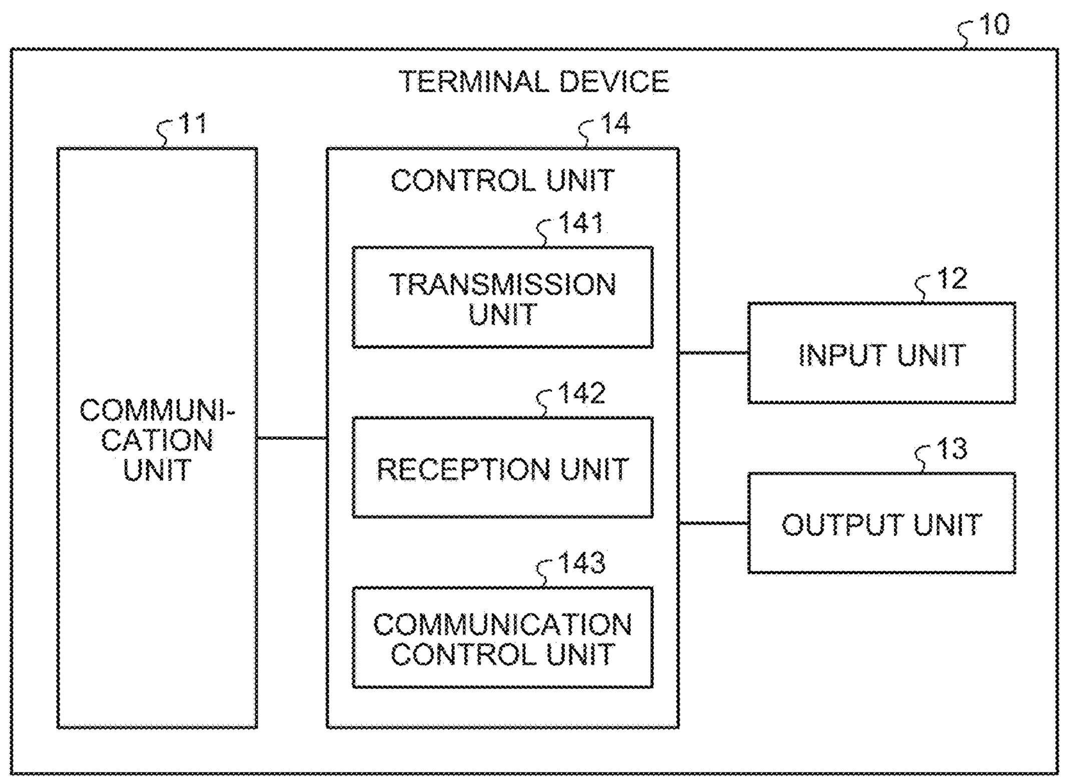
FIG. 2 is a diagram illustrating a configuration example of a terminal device according to the embodiment.

Next, a configuration of the terminal device 10 according to the embodiment will be described with reference to FIG. 2. Note that the terminal devices 20 to 40 may have a similar configuration, and thus description thereof is omitted. FIG. 2 is a diagram illustrating a configuration example of the terminal device 10 according to the embodiment. As illustrated in FIG. 2, the terminal device 10 includes a communication unit 11, an input unit 12, an output unit 13, and a control unit 14.

(Communication Unit 11)

The communication unit 11 is actualized by a network interface card (NIC), for example. The communication unit 11 is connected to a predetermined network N via a wired or wireless communication network such as 5G (Sub6) 2 to Wi-Fi 5, and transmits and receives information to and from the information processing device 100 and the like via the predetermined network N.

(Input Unit 12)

The input unit 12 receives various operations from the user. For example, the input unit 12 may receive various operations from the user via a display surface by a touch panel function. Furthermore, the input unit 12 may receive various operations from a button provided on the terminal device 10 or a keyboard or a mouse connected to the terminal device 10.

(Output Unit 13)

The output unit 13 is a display screen of a tablet terminal device and the like actualized by a display such as a liquid crystal display and an organic electro-luminescence (EL) display, for example, and is a display device for displaying various types of information.

(Control Unit 14)

The control unit 14 is a controller, for example, and is implemented by execution of various programs stored in a storage device inside the terminal device 10 by a central processing unit (CPU), a micro processing unit (MPU), or the like, using random access memory (RAM) as a work area. For example, the various programs include an operating system (OS) that runs to achieve operations of the terminal device 10 and programs of applications installed in the terminal device 10. Furthermore, the control unit 14 is actualized by, for example, an integrated circuit such as an application specific integrated circuit (ASIC) or a field programmable gate array (FPGA).

As illustrated in FIG. 2, the control unit 14 includes a transmission unit 141, a reception unit 142, and a communication control unit 143, and implements or executes operations of information processing described below.

(Transmission Unit 141)

The transmission unit 141 provides various types of information to an external information processing device. The transmission unit 141 transmits various types of information to other information processing devices such as the information processing device 100 and the external server 200. For example, the transmission unit 141 transmits NW request information. The NW request information is information including a bandwidth, a traffic characteristic, or latency requested by the terminal devices 10 to 40, for example.

(Reception Unit 142)

The reception unit 142 receives various types of information from an external information processing device. The reception unit 142 receives various types of information from other information processing devices such as the information processing device 100 and the external server 200. For example, the reception unit 142 receives instruction information from the information processing device 100.

(Communication Control Unit 143)

The communication control unit 143 controls communication of various types of information. The communication control unit 143 controls connection to a communication network, switching of the communication network, and the like. The communication control unit 143 performs control to use the communication network in accordance with instruction information from another information processing device such as the information processing device 100.

3. Configuration of Information Processing Device

Figure 3:
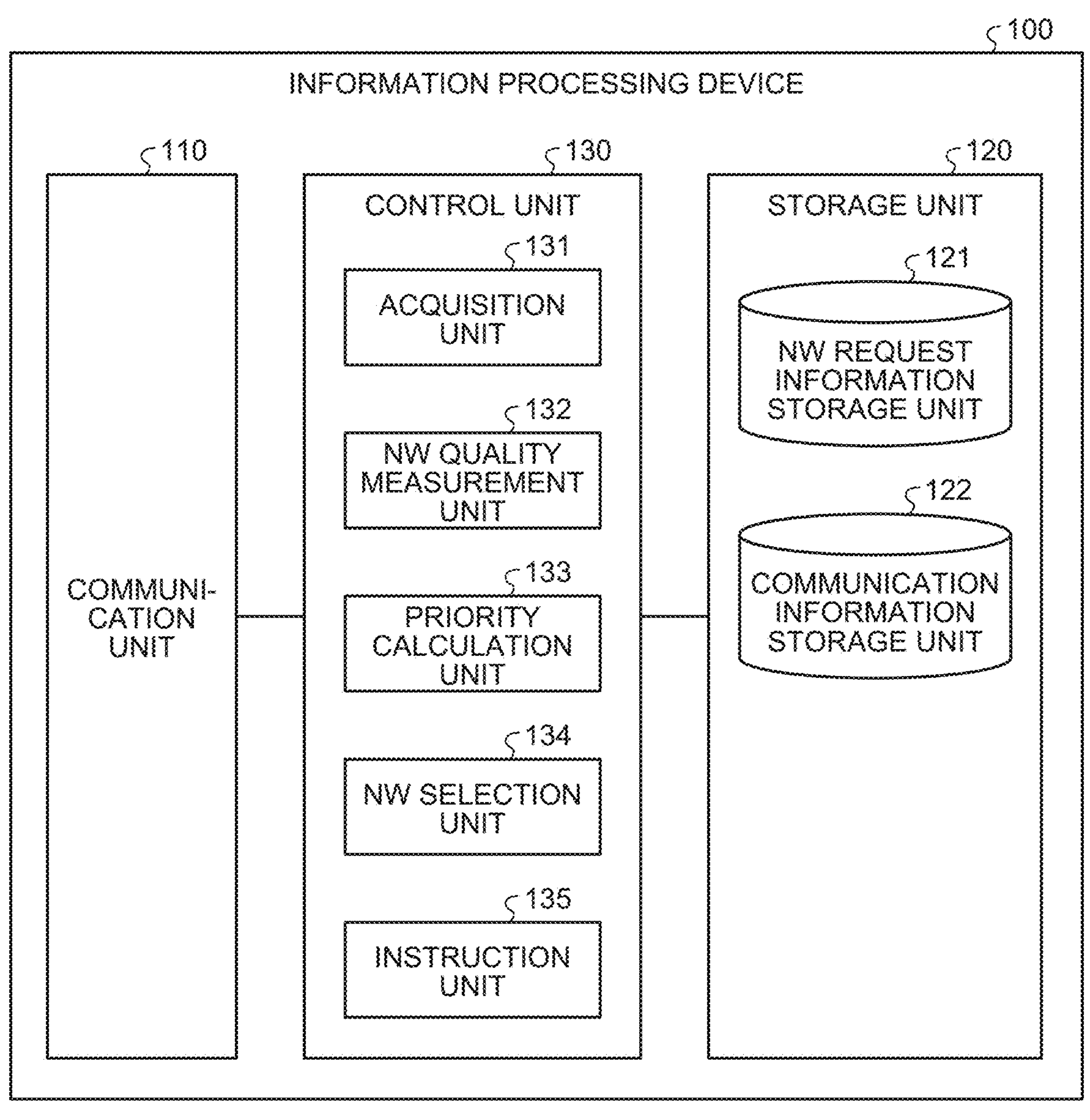
FIG. 3 is a diagram illustrating a configuration example of an information processing device according to the embodiment.

Next, a configuration of the information processing device 100 according to the embodiment will be described with reference to FIG. 3. FIG. 3 is a diagram illustrating a configuration example of the information processing device 100 according to the embodiment. As illustrated in FIG. 3, the information processing device 100 includes a communication unit 110, a storage unit 120, and a control unit 130. The information processing device 100 may include an input unit (for example, a keyboard, a mouse, etc.) that receives various operations from an administrator of the information processing device 100, and a display unit (for example, a liquid crystal display, etc.) for displaying various types of information.

(Communication Unit 110)

The communication unit 110 is implemented by a NIC, for example. The communication unit 110 is connected to the network N in a wired or wireless connection, and transmits and receives information to and from the terminal devices 10 to 40 and the like via the network N. Furthermore, the communication unit 110 may communicate by selectively connecting to a plurality of communication networks.

(Storage Unit 120)

The storage unit 120 is implemented by a semiconductor memory element such as RAM or flash memory, or by a storage device such as a hard disk or an optical disk, for example. As illustrated in FIG. 3, the storage unit 120 includes a NW request information storage unit 121 and a communication information storage unit 122.

(NW Request Information Storage Unit 121)

The NW request information storage unit 121 stores NW request information.

(Communication Information Storage Unit 122)

The communication information storage unit 122 stores information related to a communication network.

(Control Unit 130)

The control unit 130 is a controller, and is implemented by execution of various programs stored in a storage device inside the information processing device 100 by a CPU, an MPU, or the like, using RAM as a work area. Furthermore, the control unit 130 is a controller and is actualized by using an integrated circuit such as an ASIC or an FPGA, for example. The control unit 130 controls a communication network used by the terminal devices 10 to 40 in accordance with a plurality of pieces of NW request information and the communication information.

As illustrated in FIG. 3, the control unit 130 includes an acquisition unit 131, a NW quality measurement unit 132, a calculation unit 133, a NW selection unit 134, and an instruction unit 135, and implements or executes operations of information processing described below. The internal configuration of the control unit 130 is not limited to the configuration illustrated in FIG. 3, and may be another configuration as long as it is a configuration that performs information processing described below.

(Acquisition Unit 131)

The acquisition unit 131 acquires various types of information. The acquisition unit 131 acquires various types of information from other information processing devices such as the terminal devices 10 to 40 and the external server 200.

In addition, the acquisition unit 131 acquires various types of information from the storage unit 120. The acquisition unit 131 acquires various types of information from the NW request information storage unit 121 and the communication information storage unit 122.

The acquisition unit 131 stores the acquired various types of information in the storage unit 120. The acquisition unit 131 stores various types of information in the NW request information storage unit 121 and the communication information storage unit 122.

In addition, the acquisition unit 131 acquires various types of information generation, calculated, and determined by other functional configurations.

Acquisition unit 131 acquires NW request information transmitted from the terminal devices 10 to 40 and communication information indicating the statuses of the communication networks (5G (Sub6) 2 to Wi-Fi 5) usable by the terminal devices 10 to 40.

(NW Quality Measurement Unit 132)

The NW quality measurement unit 132 measures communication quality of communication networks (5G (Sub6) 2 to Wi-Fi 5) usable by the terminal devices 10 to 40.

(Calculation Unit 133)

The calculation unit 133 calculates various types of information. The calculation unit 133 calculates various types of information based on the information acquired from the storage unit 120. The calculation unit 133 calculates various types of information from the NW request information storage unit 121 and the communication information storage unit 122.

The calculation unit 133 stores the various types of information obtained by calculation in the storage unit 120. The calculation unit 133 stores various types of information in the NW request information storage unit 121 and the communication information storage unit 122.

Furthermore, the calculation unit 133 calculates various types of information acquired, generated, and determined by other functional configurations. The calculation unit 133 calculates various types of information based on various types of information acquired, generated, and determined by other functional configurations.

In addition, the calculation unit 133 calculates the priorities regarding the terminal devices 10 to 40. The calculation unit 133 calculates the priority regarding each of the terminal devices 10 to 40 in accordance with user attribute and billing information regarding the user of the terminal devices 10 to 40.

(NW Selection Unit 134)

The NW selection unit 134 selects a communication means to be used by each of the terminal devices 10 to 40. The NW selection unit 134 selects a communication network to be used by each of the terminal devices 10 to 40 based on the information acquired from the NW request information storage unit 121 or the communication information storage unit 122.

(Instruction Unit 135)

The instruction unit 135 creates instruction information instructing each of the terminal devices 10 to 40 about the communication network to be used by the terminal devices 10 to 40 based on the result selected by the NW selection unit 134.

4. Processing of Information Processing Device: Part 1

In a case where an event is held in a stadium or the like, a user being a photographer performs broadcast using the terminal device 10 which is an image shooting device to shoot a moving image. Subsequently, the terminal device 10 uploads the moving image obtained by shooting to an external storage device using one of 5G (Sub6) 2 to Wi-Fi 5. Furthermore, the user being an imaging camera operator (still camera operator) captures an image using the terminal device 20 which is an imaging device that captures an image. Subsequently, the terminal device 20 uploads the captured image (photograph) to an external storage device using one of 5G (Sub6) 2 to Wi-Fi 5. Furthermore, there is a case where a general audience uses methods including 5G (Sub6) 2 to Wi-Fi 5 to perform various types of communication using the terminal device 30 which is a smartphone or the terminal device 40.

In this manner, it is preferable to appropriately control which terminal device uses which communication network when a plurality of terminal devices can use a plurality of communication networks. With the technique of Patent Literature 1, a communication network can be selected in accordance with the communication quality of each terminal device. However, when the communication network to be used by a terminal device is currently used by another terminal device, there can be a case having difficulty in guaranteeing sufficient bandwidth, leading to a failure in appropriately using the communication network. In particular, a failure in appropriately uploading a moving image shot by the terminal device 10 or an image captured by the terminal device 20 would affect broadcast or the like, leading to a demand for providing appropriate control of the communication network used by the terminal devices 10 to 40.

Figures 4, 5:
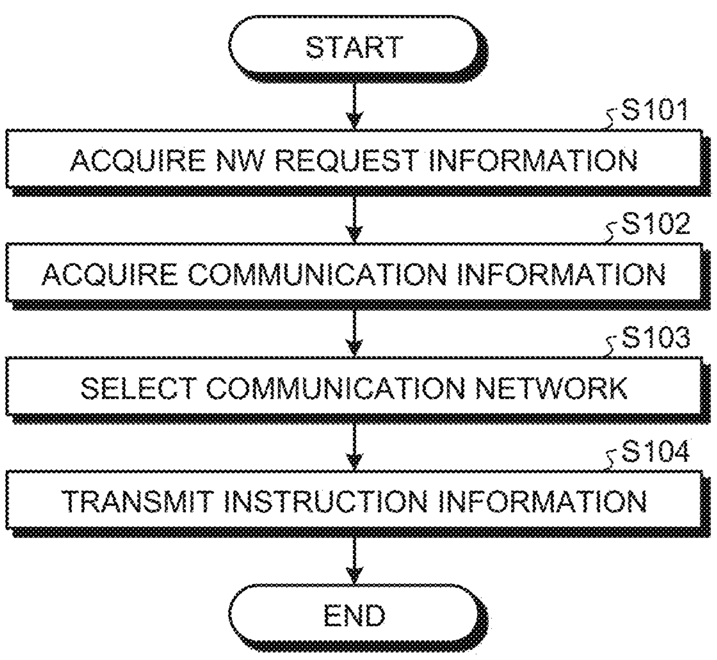
FIG. 4 is a flowchart illustrating an example of processing executed by an information processing device.
FIG. 5 is a diagram illustrating an example of a communication network.

FIG. 4 is a flowchart illustrating an example of processing executed by an information processing device. First, the acquisition unit 131 of the information processing device 100 acquires NW request information from the terminal devices 10 to 40 (step S101). Examples of the NW request information are information including a bandwidth, a traffic characteristic, a latency, or the like requested by the terminal devices 10 to 40. The terminal devices 10 to 40 transmits a NW request file including the NW request information to the information processing device 100. Specifically, the NW request information is information describing requirements such as an expected throughput, whether the throughput needs to be instantaneously output, whether a constant throughput is continuously needed ("stable/unstable"), and a minimum communication frequency to be performed as intervals in seconds.

In order to upload a moving image used for broadcast, the terminal device 10 requests stable communication with less jitter for time synchronization in accordance with a video size used for broadcast. Therefore, in the NW request information of the terminal device 10, for example, the requested average bandwidth is 100 Mbps, and the requested traffic characteristic is "stable".

In contrast, while the terminal device 20 needs high-speed communication for uploading a large amount of image data (photographs), uploading of the image data may be performed either at the timing of capturing the image or after storing a sufficient amount of data in a storage medium such as an SD card. Therefore, in the NW request information of the terminal device 20, for example, the requested average bandwidth is 10 Gbps, and the requested traffic characteristic is "unstable". Incidentally, while instantaneous throughput is preferably high even in a case where a moving image is shot and uploaded not for broadcast but for recording, the traffic characteristic may be "unstable" because the moving image can be temporarily stored in the storage unit or the like.

Furthermore, the terminal device 30 and the terminal device 40 appropriately transmit NW request information in accordance with the use status of the user.

Subsequently, the acquisition unit 131 of information processing device 100 acquires communication information regarding 5G (Sub6) 2 to Wi-Fi 5 (step S102). FIG. 5 is a diagram illustrating an example of a communication network. FIG. 5 illustrates, from the left, a name of a communication network (hereinafter, also referred to as a "bearer"), a usable average bandwidth, communication traffic characteristic, and latency in communication. As illustrated in FIG. 5, for example, 5G (mmW) 3 can perform communication in which an average bandwidth is 10 Gbps, a traffic characteristic is "unstable" (communication is performed in an unstable manner), and a latency is 2 ms. Similarly, 5G (Sub6) 2 can perform communication with an average bandwidth of 100 Mbps, a traffic characteristic stable (communication is performed in a stable manner), and a latency of 10 ms. Similarly, 4G (LTE) 4 can perform communication with an average bandwidth of 10 Mbps, a traffic characteristic stable (communication is performed in a stable manner), and a latency of 100 ms.

Note that it is preferable that acquisition unit 131 of information processing device 100 also acquires information related to communication quality of 5G (Sub6) 2 to Wi-Fi 5 as the communication information. The information processing device 100 always establishes a session with the terminal devices 10 to 40, and sets the terminal devices 10 to 40 to report the communication quality periodically or when instructed by the information processing device 100.

Specific examples of the parameter related to the communication quality of Wi-Fi 5 acquired by the information processing device 100 include information such as: PHY protocol type (a/b/g/n/ac/ax), MAC protocol type (d/e/h/i/j/k/p/v/w/y/z), signal strength (RSSI), use frequency, SSID, BSSID, an allocated bandwidth, RTT of radio interval for an AP, an S/N ratio, frequency spectrum, the number of terminals in a same Basic Service Set (BSS), an authentication method, the number of MIMO layers, the number of signal collisions, the number of RTS/CTS per unit time, the number of probe requests, the number of beacon reception, a reception/transmission packet counter value, the number of successful transmissions, the number of retransmitted transmission, the number of broken frames, the number of interface errors, cca_busy_time, contentionAverageTime, RadioOnTime, and the number of frames existing in a Wi-fi transmission buffer queue. The information processing device 100 may acquire any parameter as long as it is information related to Wi-Fi 5, not limited to the above example.

Furthermore, specific examples of the parameter related to the communication quality of a cellular network such as 5G (Sub6) 2, 5G (mmW) 3, or 4G (LTE) 4 acquired by the information processing device 100 include information such as: the number of Component Carriers, an average rate (Modulation and Coding Scheme (MCS)), Capability (LTE/HSPA+/Global System of Mobile communications (GSM), signal strength, the number of MIMO layers, the number of communication allocation times, the number of actual resource blocks, a reception/transmission packet counter value, the number of successful transmissions, the number of successful receptions, the number of frame retransmissions (MAC), the number of RLCs, the number of interface errors, throughput (PHY/IP), cell information (CELL ID, transmission power of DL reference signal, adjacent cell information, number of persons accommodated in a cell, and backbone bandwidth information), AsuLvel, Cqi, dbm, Level, RSRP, RSSI, RSSNR, TimingAdvance, user's communication plans, and remaining communicable capacity in month in the communication plan. The information processing device 100 may acquire any parameter as information related to a cellular network, not limited to the above example.

The NW quality measurement unit 132 of the information processing device 100 measures the communication quality using the parameter observable by the information processing device 100 and the parameter acquired from the terminal devices 10 to 40, and predicts the network status obtained in several seconds. The prediction may use a method such as a simple linear regression model or a more complicated neural network. Thereafter, the NW selection unit 134 of the information processing device 100 selects the communication networks (5G (Sub6) 2 to Wi-Fi 5) to be used by the terminal devices 10 to 40 (step S103). Specifically, since the terminal device 10 requests "stable" communication of 100 Mbps, the NW selection unit 134 selects 5G (mmW) 3 satisfying this condition as a network to be used by the terminal device 10. In addition, since the terminal device 20 requests "unstable" communication of 10 Gbps, the NW selection unit 134 selects 5G (Sub6) 2 satisfying this condition as a network to be used by the terminal device 20.

Subsequently, the instruction unit 135 of the information processing device 100 transmits instruction information instructing a communication network to be used by each of the terminal devices 10 to 40 (step S104). Specifically, the instruction unit 135 transmits instruction information to the terminal device 10 to use the 5G (mmW) 3 selected by the NW selection unit 134. In response to this, the communication control unit 143 of the terminal device 10 attempts connection to use 5G (mmW) 3 in accordance with the instruction information. Similarly, the instruction unit 135 transmits the instruction information to the terminal device 20 to use 5G (Sub6) 2 selected by the NW selection unit 134. In response to this, the communication control unit of the terminal device 20 attempts connection to use 5G (Sub6) 2 in accordance with the instruction information.

Note that a conventional bandwidth guarantee technique may be used as a method used by the information processing device 100 to guarantee the bandwidth of each communication network to be used by the terminal devices 10 to 40. For example, applicable techniques include IntServ type bandwidth guarantee, policing for each flow on each router or switch, or shaping on the transmission queue of the client. In addition, the bandwidth may be preferentially used by a QoS field, a VLAN tag, or the like. It is also allowable to use a TE function of MPLS or a path enabling a network bandwidth using SRv6.

In addition, the NW selection unit 134 performs traffic control on various network devices. These constantly change with the situation of the bearer and the situation of the client, and thus, it is preferable to dynamically change the settings of various network devices.

As described above, according to the information processing device 100, the NW selection unit 134 controls the communication network used by the terminal devices 10 to 40 in accordance with NW request information and communication information, making it possible to appropriately distribute the communication network in response to the request of the terminal devices 10 to 40. In particular, it is possible to allocate, to the terminal device that requests the "stable" communication, a "stable" communication network capable of using the minimum bandwidth requested by the terminal device. In contrast, among terminal devices requesting a great bandwidth, it is possible to allocate, to the terminal device 10 that can manage with "unstable" communication, an "unstable" communication network satisfying the requested bandwidth. This makes it possible to prevent a situation in which connection concentrates on one communication network and requests from the terminal devices 10 to 40 cannot be handled.

5. Processing of Information Processing Device: Part 2

Figure 6:
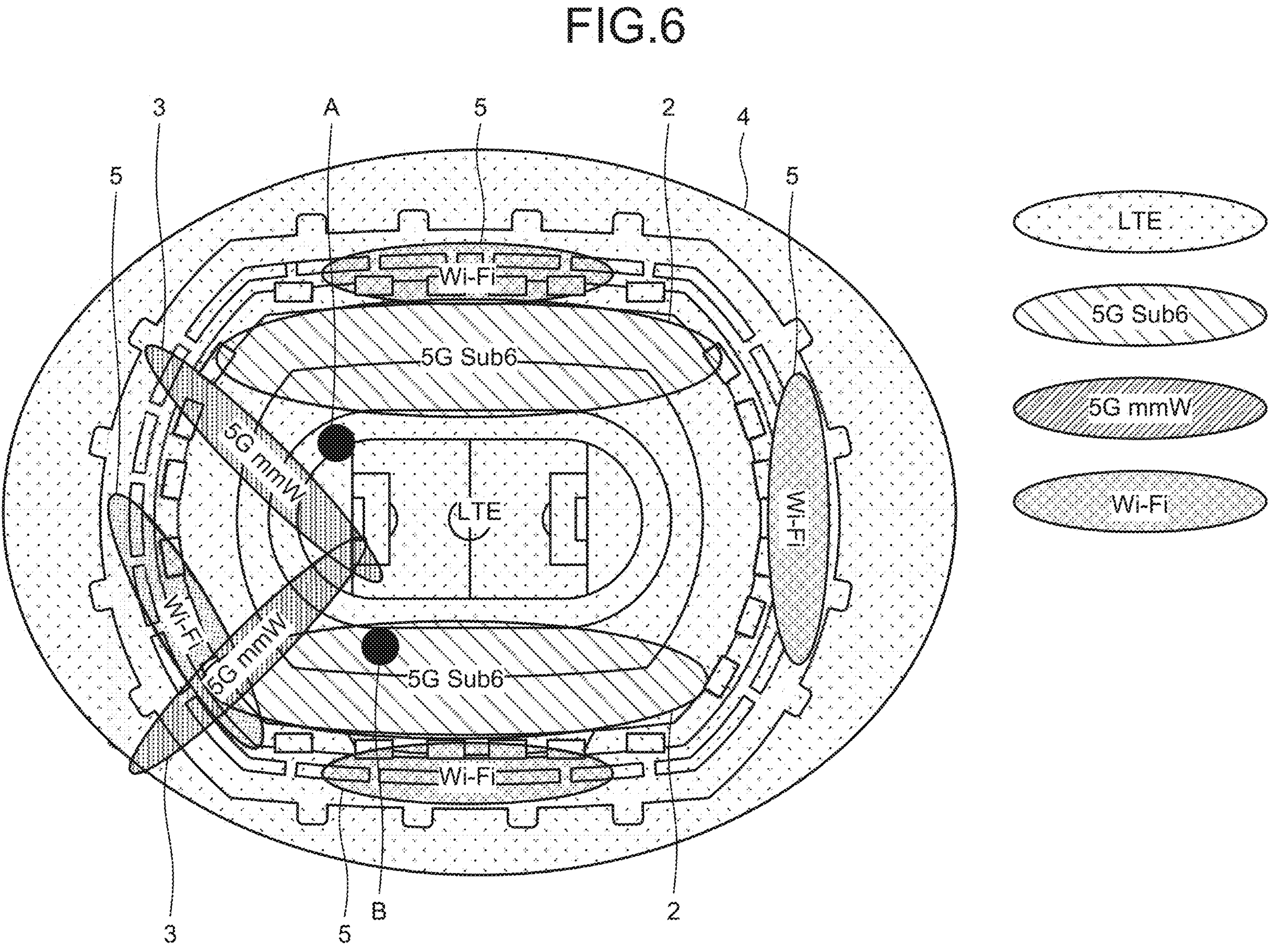
FIG. 6 is a diagram illustrating an example of a communication network.

FIG. 6 is a diagram illustrating an example of a communication network. As illustrated in FIG. 6, here is an example of an assumable case as a place where many people gather such as a stadium where communication networks of 5G (Sub6) 2, 5G (mmW) 3, 4G (LTE) 4, and Wi-Fi 5 are each usable in illustrated regions.

Figure 7:
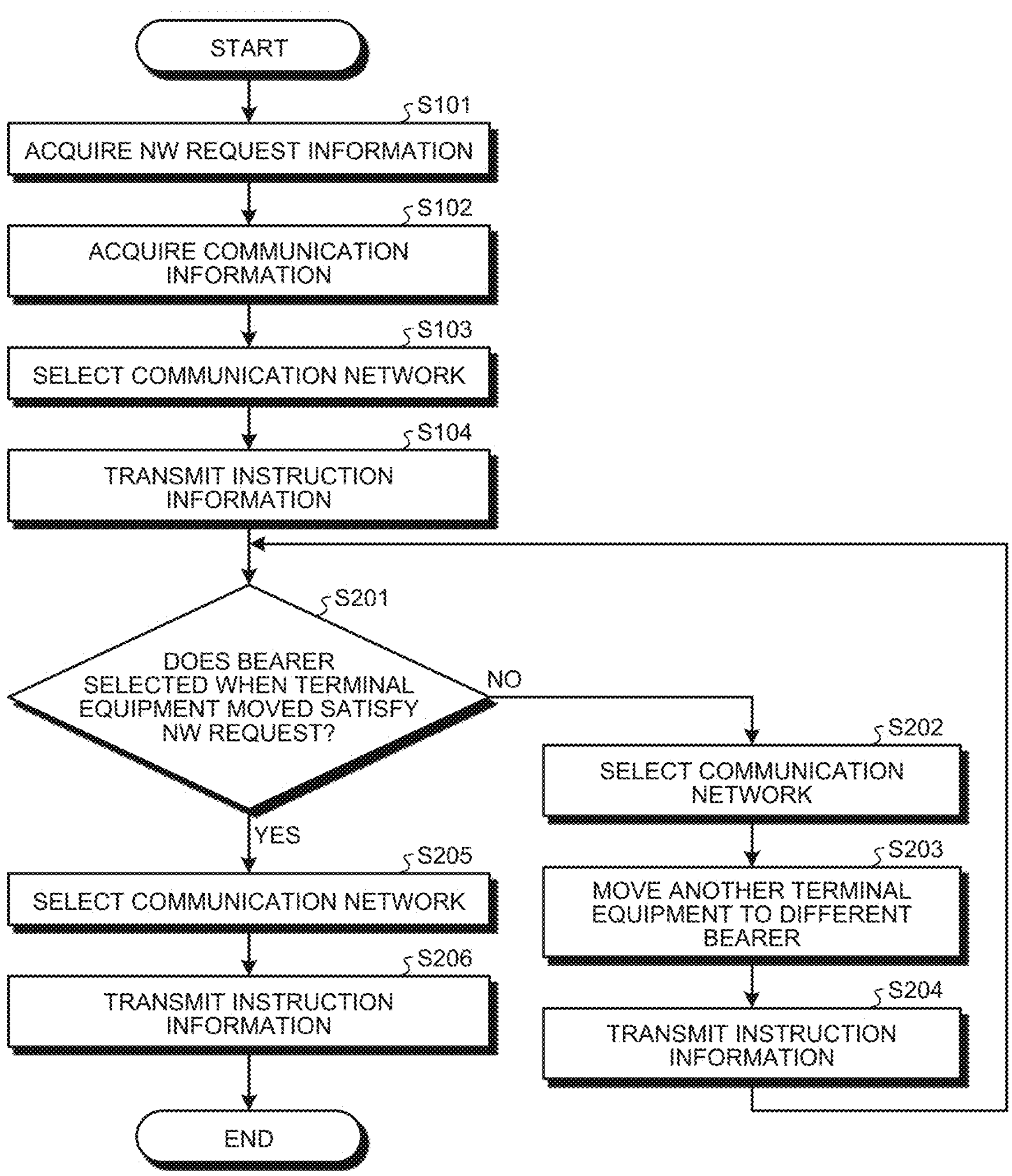
FIG. 7 is a flowchart illustrating an example of processing executed by an information processing device.

FIG. 7 is a flowchart illustrating an example of processing executed by the information processing device. As illustrated in FIG. 7, the acquisition unit 131 of the information processing device 100 acquires NW request information from the terminal devices 10 to 40 (step S101). Here, the NW request information is, for example, information including not only a bandwidth, a traffic characteristic, or a latency requested by the terminal devices 10 to 40 but also a bandwidth associated with position information that changes with time requested by each of the terminal devices 10 to 40 or information related to a requested bandwidth that changes with time. Specifically, the terminal device 10 requests "stable" communication with an average bandwidth of 10 Mbps for the first 30 minutes at point A, then moves to point B, and requests "stable" communication with an average bandwidth of 100 Mbps. Incidentally, the position information may be designated by addresses obtained by dividing a target region such as a stadium illustrated in FIG. 6 into a mesh as assigned regions, or may be designated by latitude, longitude, and altitude measured by GPS. Furthermore, the time may be designated as absolute time by date/time, or may be designated as relative time as minutes from a predetermined time (for example, from the start time point of the program).

Subsequently, the acquisition unit 131 of information processing device 100 acquires communication information regarding 5G (Sub6) 2 to Wi-Fi 5 (step S102). The communication information may be similar to that in FIG. 5, and thus description thereof is omitted.

Thereafter, the NW selection unit 134 of the information processing device 100 selects the communication networks (5G (Sub6) 2 to Wi-Fi 5) to be used by the terminal devices 10 to 40 (step S103). Specifically, since the terminal device 10 requests "stable" communication of 10 Mbps for the first 30 minutes at point A, the NW selection unit 134 selects 4G (LTE) 4 satisfying this condition to be used by the terminal device 10.

Subsequently, the instruction unit 135 of the information processing device 100 transmits instruction information instructing a communication network to be used by each of the terminal devices 10 to 40 (step S104). Specifically, the instruction unit 135 transmits, to terminal device 10, instruction information to use 4G (LTE) 4 selected by the NW selection unit 134. In response to this, the communication control unit 143 of the terminal device 10 uses 4G (LTE) 4 in accordance with the instruction information.

Subsequently, the NW selection unit 134 of the information processing device 100 determines whether the bearer (4G (LTE) 4) selected when the terminal device 10 moved from point A to point B satisfies the NW request (step S201). Here, since the terminal device 10 requests "stable" communication with an average bandwidth of 100 Mbps at point B and the average bandwidth of 4G (LTE) 4 is 10 Mbps, the NW selection unit 134 determines that the bearer (4G (LTE)

4) selected when the terminal device 10 moved to point B does not satisfy the NW request (step S201: No), and the NW selection unit 134 selects again the communication network to be used by the terminal device 10 (step S202). At point B, the NW selection unit 134 selects 5G (Sub6) 2 capable of "stable" communication with an average bandwidth of 100 Mbps as the communication network to be used by terminal device 10.

At this time, when another terminal device uses the 5G (Sub6) 2 and the average bandwidth of 100 Mbps cannot be reserved, the NW selection unit 134 selects to move the another terminal device using the 5G (Sub6) 2 to a different bearer (step S203). In this manner, when there is a flow of traffic to be prioritized, the NW selection unit 134 preferably optimizes the traffic by moving the another traffic to a different bearer.

Subsequently, based on the result of selection by the NW selection unit 134, the instruction unit 135 of the information processing device 100 transmits instruction information instructing a communication network to be used by each of the terminal devices 10 to 40 (step S204). Thereafter, the processing returns to step S201 to continue.

In contrast, in a case where the NW selection unit 134 determines in step S201 that the bearer (4G (LTE) 4) selected when the terminal device 10 moved to point B satisfies the NW request (step S201: Yes), the NW selection unit 134 selects the communication network so that the terminal device 10 continuously uses the selected bearer (4G (LTE) 4) (step S205).

Subsequently, based on the result of selection by the NW selection unit 134, the instruction unit 135 of the information processing device 100 transmits instruction information instructing the communication network to be used by each of the terminal devices 10 to 40 (step S206) to complete a series of processing.

As described above, in a case where the NW request information includes information related to the bandwidth, which is associated with the position information changing with time, requested by each of the terminal devices 10 to 40, the NW selection unit 134 selects a usable communication network in accordance with the position information. Furthermore, in a case where the NW request information includes information related to a requested bandwidth changing with time, the NW selection unit 134 selects a usable communication network in accordance with time. As a result, even when the NW request information changes in accordance with the position or time, the communication network to be used by each terminal device can be appropriately selected.

The example described above is an example in which the bandwidth requested by the terminal device 10 is shifted from 10 Mbps to 100 Mbps, whereby the bandwidth requested by the terminal device 10 exceeds the used bandwidth of the bearer (4G (LTE) 4) and a different bearer (5G (Sub6) 2) is used. In this manner, when a bearer cannot provide a bandwidth requested by the terminal device, the NW selection unit 134 may use a different bearer.

For example, the NW selection unit 134 may use a different bearer when moving from an area where each bearer is usable to the outside of the area. Specifically, here is an assumable case of a stadium illustrated in FIG. 6, where the terminal device 10 requests "stable" communication with an average bandwidth of 10 Mbps and uses 5G (Sub6) 2. When the terminal device 10 goes out of the area where the 5G (Sub6) 2 is usable, the NW selection unit 134 may allow the terminal device 10 to use the 4G (LTE) 4 to enable "stable" communication at the average bandwidth of 10 Mbps.

6. Processing of Information Processing Device: Part 3

Figure 8:
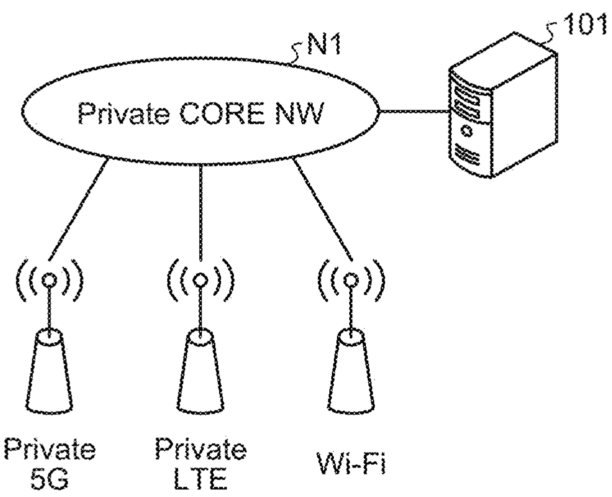
FIG. 8 is a diagram illustrating a configuration example of a communication network.

FIG. 8 is a diagram illustrating a configuration example of a communication network. As illustrated in FIG. 8, Private 5G, Private LTE, and Wi-Fi are connected as communication networks to a network N1 being a private core NW. In this manner, when controlling a private network, it is possible to control each communication network by an information processing device 101. The information processing device 101 may have a configuration similar to the configuration of the information processing device 100, and thus description thereof is omitted.

The information processing device 101 transmits instruction information of giving an instruction to use a bearer (Private 5G, Private LTE, or Wi-Fi) to the terminal device by an algorithm selecting a communication network. The instruction information includes information such as a bearer to be used, time, and permitted communication characteristics (throughput and latency). The terminal device connects to an appropriate bearer according to the instruction information. Note that the information processing device 101 may transmit the instruction information to a controller that controls Private 5G, Private LTE, and Wi-Fi. The terminal device may use a plurality of bearers according to the instruction information.

7. Processing of Information Processing Device: Part 4

Figure 9:
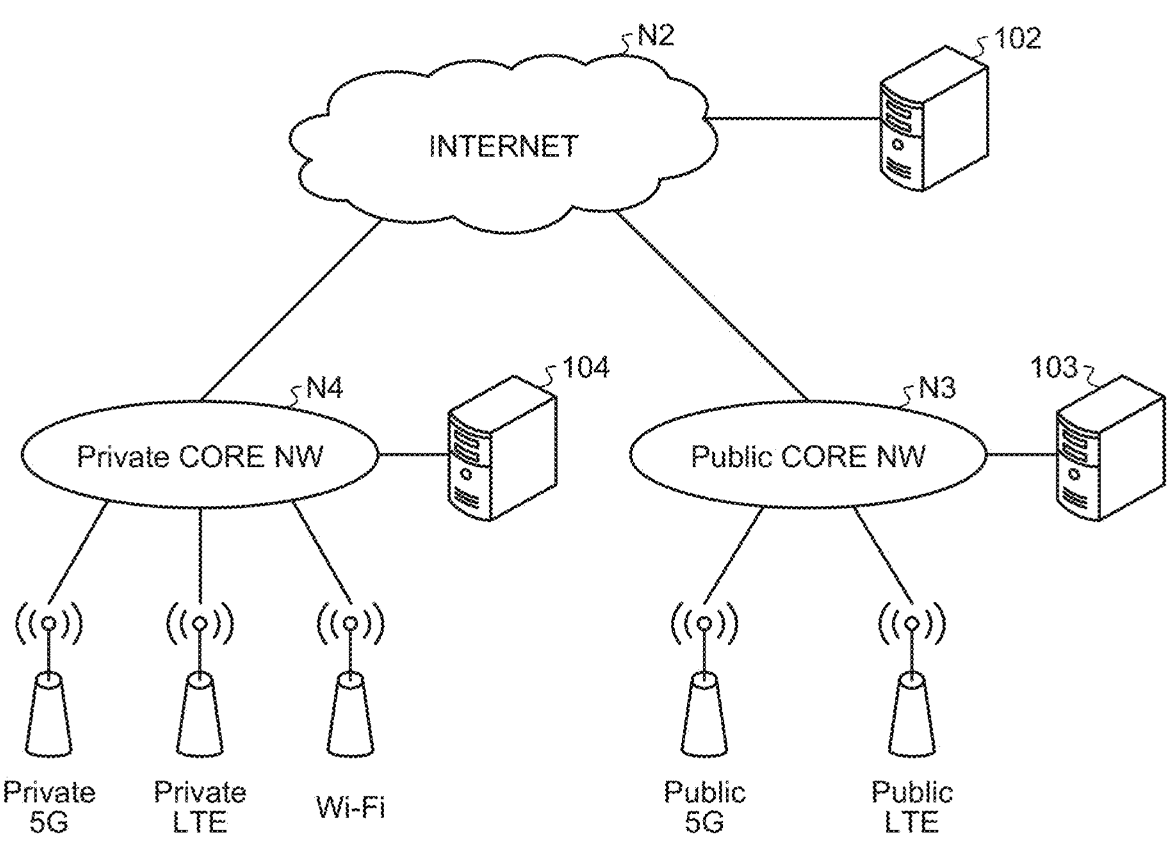
FIG. 9 is a diagram illustrating a configuration example of a communication network.

FIG. 9 is a diagram illustrating a configuration example of a communication network. As illustrated in FIG. 9, a network N2 which is an Internet channel, is connected to a network N3 being a public core NW and to a network N4 being a private core NW. The network N3 is connected to communication networks of Public 5G and Public LTE. The network N4 is connected to communication networks of Private 5G, Private LTE, and Wi-Fi. In this manner, in a case of controlling a channel in which public networks and private networks are mixed, the information processing device 102 connected to the network N2 controls the communication networks used by the individual terminal devices.

The information processing device 102 transmits instruction information for giving an instruction to use a bearer (Private 5G, Private LTE, Wi-Fi, Public 5G, or Public LTE) to the terminal device by an algorithm selecting a communication network. However, in a case of allowing the terminal device to use the public network (network N2), the information processing device 102 may transmit the instruction information to the information processing device 103 that controls Public 5G and Public LTE. Furthermore, in a case of allowing the terminal device to use a private network, the information processing device 102 may transmit the instruction information to the information processing device 104 that controls Private 5G, Private LTE, and Wi-Fi. Furthermore, the information processing device 104 may transmit the instruction information to the terminal device, the information processing device 103, and the like. The terminal device may use a plurality of bearers according to the instruction information.

8. Case where Network Capacity is Insufficient

When the NW selection unit 134 selects a communication network (for example, 5G (Sub6) 2 to Wi-Fi 5), there is a case where it is difficult to respond to a request from each terminal device.

(8-1. Case where Total Network Capacity is Insufficient)

When the total network capacity requested by the individual terminal devices exceeds the total network capacity of the individual communication networks, the NW selection unit 134 either restricts the use of the communication network by the terminal device with low priority calculated by the calculation unit 133 or stops the use of the communication network by the terminal device with low priority calculated by the calculation unit 133.

Figure 10:
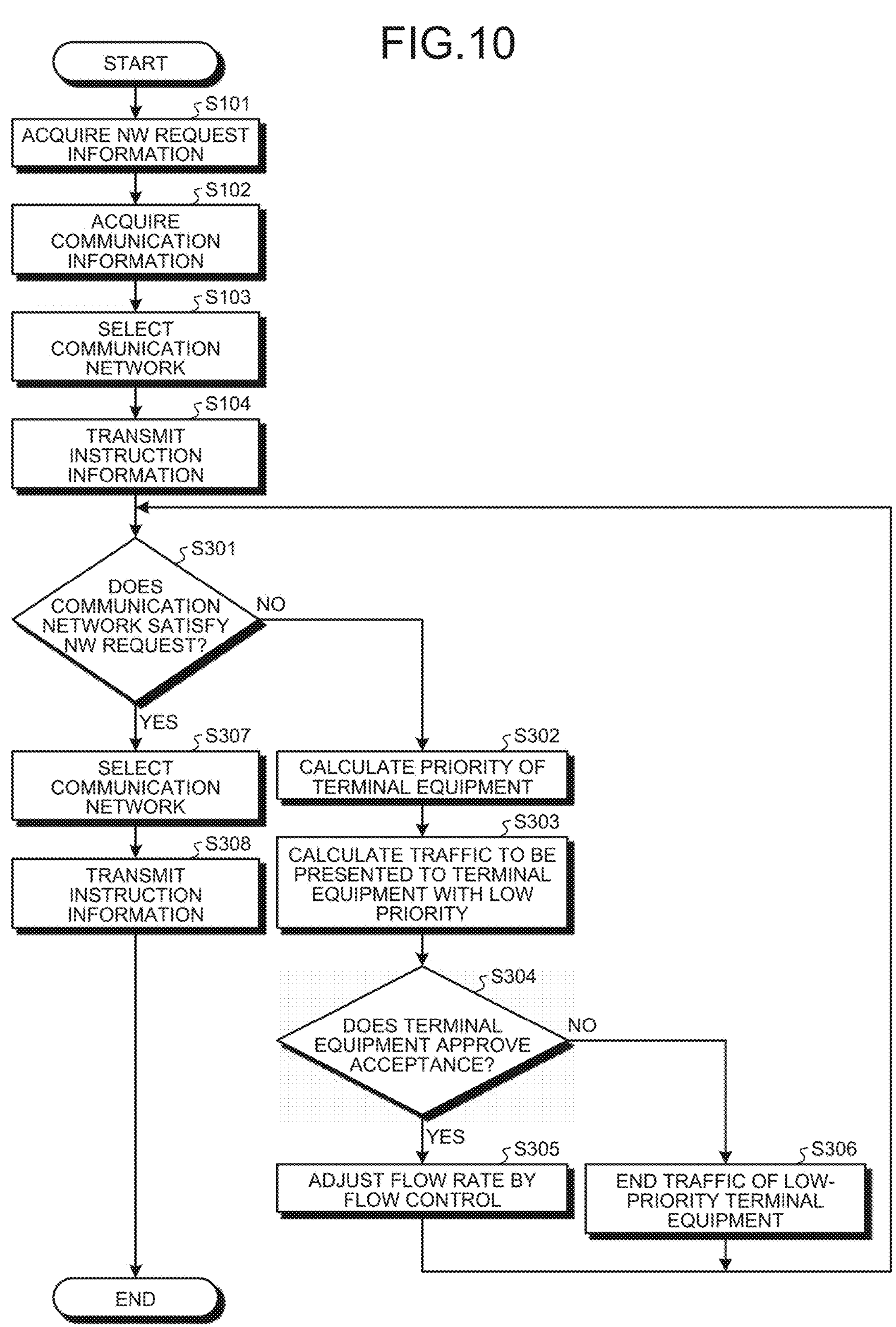
FIG. 10 is a diagram illustrating a flowchart of an example of processing executed by an information processing device.
Figures 11, 12:
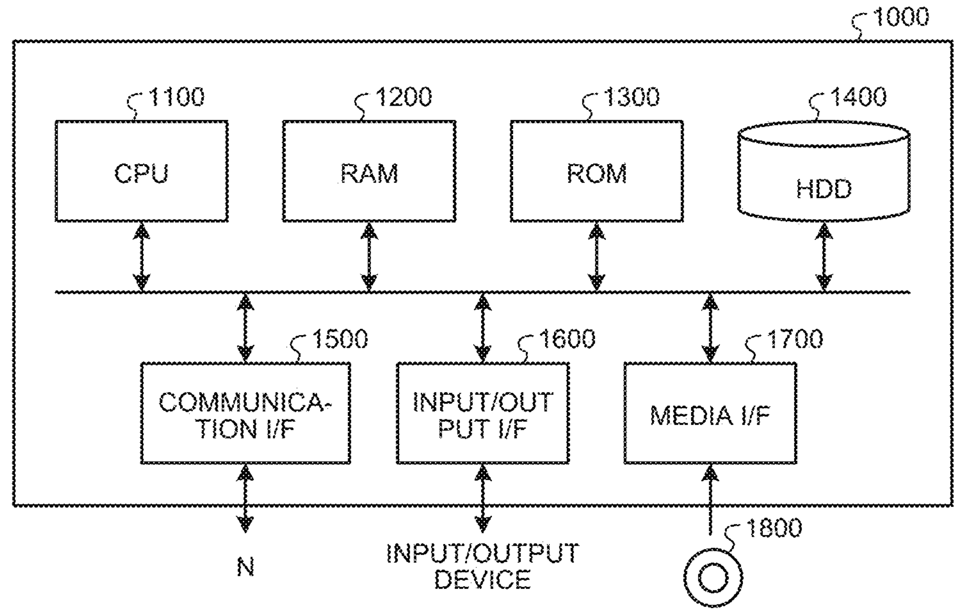
FIG. 11 is a diagram illustrating priorities of terminal devices.
FIG. 12 is a hardware configuration diagram illustrating an example of a computer that implements functions of an information processing device.

FIG. 10 is a diagram illustrating a flowchart of an example of processing executed by the information processing device. As illustrated in FIG. 10, steps S101 to S104 are executed similarly to FIG. 4. FIG. 11 is a diagram illustrating priorities of terminal devices. As illustrated in FIG. 11, the NW selection unit 134 selects a communication network for the terminal device corresponding to client ID 1 to 3, and each terminal device uses the selected communication network. Specifically, a terminal device corresponding to client ID 1 uses communication with a bandwidth of 1000 Mbps, having an "unstable" characteristic, and a latency of 2 ms with a communication network of 5G (mmW). Similarly, a terminal device corresponding to client ID 2 uses communication with a bandwidth of 100 Mbps, having a "stable" characteristic, and a latency of 10 ms, with a communication network of 5G (Sub6). Still further, a terminal device corresponding to client ID 3 uses communication with a bandwidth of 10 Mbps, having a "stable" characteristic, and a latency of 100 ms, with a communication network of 4G (LTE).

Here, when the acquisition unit 131 has newly acquired NW request information, the NW selection unit 134 determines whether the total of the communication network capacities satisfies the network capacity requested by the NW request information (step S301).

When the NW selection unit 134 determines that the total of the communication network capacities does not satisfy the requested network capacity (step S301: No), the calculation unit 133 calculates the priority of each terminal device (step S302). The priorities of the terminal devices corresponding to the client ID 1 to 3 calculated by the calculation unit 133 are 8, 6, and 0, respectively. The acquisition unit 131 acquires, from the external server 200, information such as a billing status to a service and whether there is another network. The calculation unit 133 calculates the priority based on information such as the high/low levels of billing and the presence/absence of subscription to network guarantee services. Furthermore, in a case where another network is usable, the calculation unit 133 may notify to use the another network and may disconnect the communication network currently used by the terminal device.

Thereafter, the NW selection unit 134 calculates the traffic to be presented to the terminal device with low priority (step S303), and presents the calculated traffic to the terminal device corresponding to client ID 3 with the lowest priority. The NW selection unit 134 may calculate a maximum value that can be currently provided as the value to be presented to the terminal device 10. Specifically, it is allowable to calculate a value obtained by dividing the total network capacity that can be provided for each bearer by the number of terminal devices. Further, the NW selection unit 134 may calculate traffic necessary for reserving the network capacity needed by the terminal device that has newly transmitted the NW request information, and may reduce the network capacity to be used by the bearer with low priority.

Next, the NW selection unit 134 determines whether the terminal device approves the acceptance of the traffic presented to the terminal device (step S304).

When the NW selection unit 134 determines that the terminal device has approves the acceptance of the presented traffic (step S304: Yes), the instruction unit 135 transmits instruction information corresponding to the traffic presented to the terminal device, controls the flow used by each terminal device, and adjusts the diversion of the network of each communication terminal (step S305). Thereafter, the processing returns to step S301 to continue.

In contrast, when the NW selection unit 134 determines that the terminal device does not approve the acceptance of the presented traffic (step S304: No), the NW selection unit 134 presents the terminal device with the next lowest priority so as to reduce the traffic. When no terminal device accepts the presented traffic, the NW selection unit 134 decides to stop the use of the communication network by the terminal device with low priority, and then based on this decision, the instruction unit 135 transmits instruction information to stop the use of the communication network by the terminal device with low priority (step S306). When the terminal device whose use of the network is to be stopped has a traffic characteristic "unstable", the network may be temporarily stopped, and the terminal device may be allowed to perform communication using an unoccupied time of network. Any scheduling method may be used at this time, such as a deadline based method or aging. Thereafter, the processing returns to step S301 to continue.

In contrast, when the NW selection unit 134 determines that the total of the communication network capacities satisfies the requested network capacity in step S301 (step S301: Yes), the NW selection unit 134 maintains the communication network used by each terminal device, and selects a communication network to be used by the terminal device that has newly transmitted NW request information (step S307).

Subsequently, based on the result of selection by the NW selection unit 134, the instruction unit 135 of the information processing device 100 transmits instruction information instructing the communication network to be used by each of the terminal devices 10 to 40 (step S308) to complete a series of processing.

As described above, in a case where the sum of the communication networks does not satisfy the requested network capacity at acquisition of new NW request information, the use of the network by the terminal device with low priority is restricted or stopped, making is possible to guarantee the use of the communication network by the terminal device with high priority.

(8-2. Case where Network Bandwidth of Specific Bearer is Insufficient)

In a case where the network capacity requested for a specific bearer among the communication networks (for example, 5G (Sub6) 2 to Wi-Fi 5) exceeds the total capacity of networks the bearer can provide, the NW selection unit 134 examines whether the request for the specific bearer can be provided by a different bearer, that is, checks to see whether redistribution of networks is possible. In a case where the request of each terminal device can be satisfied by redistributing the network, the instruction unit 135 transmits instruction information according to the selection of the NW selection unit 134.

In contrast, when the request of each terminal device cannot be satisfied even with execution of redistribution of network, the NW selection unit 134 restricts the use of the communication network by the terminal devices 10 to 40 having a low priority calculated by the calculation unit 133 or stops the use of the communication network by the terminal devices 10 to 40 having a low priority calculated by the calculation unit 133.

9. First Modification

The information processing device 100 may perform network control at the time of disaster. At the time of disaster, cellular resources (for example, 5G (Sub6) 2 to 4G (LTE) 4 or the like) are preferentially allocated to communication of terminal devices possessed by highly urgent persons such as personnel of the SDF or an ambulance team. On the other hand, Wi-Fi 5 networks are assigned to people in a shelter or the like with an ordinary-level user attribute. Note that, since the sufferers include people who have urgency such as persons seeking rescue, it is preferable to give priority appropriate for the situation even to people with an ordinary-level user attribute. Furthermore, persons with an ordinary-level user attribute might include a volunteer member or the like. Therefore, it is preferable to finely assign priorities to the users in accordance with the situation instead of performing recognition by the user attribute alone.

Here, the user attribute is preregistered in the external server 200, and the acquisition unit 131 appropriately acquires the user attribute from the external server 200. It is allowable to register, as the user attribute, requirements of a network including information such as whether the user is a staff member of the SDF or an ambulance team, whether a phone call is necessary, and whether there is a need to have a network bandwidth for transferring an image and a video for reporting a disaster status.

When a plurality of bearers is usable, the NW selection unit 134 may select a bearer that satisfies the requirements of the network. On the other hand, when only one bearer is usable such as when only 4G (LTE) is usable in rural areas, the NW selection unit 134 reserves a 4G (LTE) resource. The NW selection unit 134 performs setting so as to perform bandwidth guarantee on the cellular network and the router.

The NW selection unit 134 performs control to stop the connection to the cellular network from a user (such as a sufferer) other than the emergency party and having moved to a shelter or the like and is in a relatively stable situation and control to have them use Wi-Fi installed in the disaster site. The NW selection unit 134 can also allow the area including persons needing rescue to perform active use of the cellular network. The NW selection unit 134 can control the communication network by estimating the state of the user from the user attribute acquired from the external server 200 and the position information of the terminal device. Furthermore, an operator who manages the information processing device 100 may select a communication network to be used by each terminal device based on the user attribute acquired from the external server 200 and the position information of the terminal device. Note that the information processing device 100 may either acquire the position information transmitted by the terminal device or estimate the position information of the terminal device from the position information of a base station connected to the terminal device.

10. Second Modification

The information processing device 100 may control the network in a game tournament. When an online game tournament using a smartphone or the like is held, a large number of players simultaneously performs communication in some cases. In a game, although there is a moment when a network is intensively used (for example, when a game screen is loaded), real-time (stable) communication is not necessary in normal times. In contrast, during a battle or the like in a game, a stable and low-latency network is necessary while a large traffic capacity is not needed. In a case where a game is played individually, traffic reservation during the battle is not an issue. However, in a case where a large-scale online game tournament is held, it is necessary to effectively use a limited network.

The organizer of the game tournament schedules at which time each terminal device will participate in the battle based on a tournament program, and stores the schedules in the storage unit 120 as NW request information. Based on the stored NW request information, the NW selection unit 134 of the information processing device 100 allows the terminal device currently participating in the battle to preferentially use a “stable” communication network of the requested bandwidth. On the other hand, the NW selection unit 134 sets the terminal device not currently participating in the battle to use a “unstable” communication network. This makes it possible to provide stable traffic to the users currently participating in the battle while providing the users not currently participating in the battle to use a communication network. Incidentally, the NW selection unit 134 may set a lowest priority to the traffic of the spectators who are not the participants of the game and stop using the communication network as necessary.

11. Third Modification

The information processing device 100 may control a network in an exhibition. During an exhibition, Wi-Fi is prepared for visitors in some cases. The NW selection unit 134 allows exhibitors to preferentially use the Wi-Fi when the exhibitors participates in a demonstration or a remote conference, and guarantees the use of the communication network by the exhibitors. At that time, the NW selection unit 134 sets ordinary visitors to use a cellular network (5G (Sub6), 5G (mmW), 4G (LTE), and the like).

12. Hardware Configuration

Furthermore, the terminal devices 10 to 40, the information processing device 100, and the external server 200 according to the above-described embodiments are implemented by a computer 1000 having a configuration as illustrated in FIG. 12, for example. FIG. 12 is a hardware configuration diagram illustrating an example of the computer that implements the functions of the terminal devices 10 to 40, the information processing device 100, and the external server 200. The computer 1000 includes a CPU 1100, RAM 1200, ROM 1300, an HDD 1400, a communication interface (I/F) 1500, an input/output interface (I/F) 1600, and a media interface (I/F) 1700.

The CPU 1100 operates based on a program stored in the ROM 1300 or the HDD 1400 so as to control each of components. The ROM 1300 stores a boot program executed by the CPU 1100 at startup of the computer 1000, a program depending on hardware of the computer 1000, and the like.

The HDD 1400 stores a program executed by the CPU 1100, data used by the program, and the like. The communication interface 1500 receives data from another device via a predetermined communication network, transfers the data to the CPU 1100, and transmits data generated by the CPU 1100 to another device via a predetermined communication network.

The CPU 1100 controls an output device such as a display or a printer and an input device such as a keyboard or a mouse via the input/output interface 1600. The CPU 1100 acquires data from the input device via the input/output interface 1600. In addition, the CPU 1100 outputs the generated data to the output device via the input/output interface 1600.

The media interface 1700 reads a program or data stored in the recording medium 1800 and provides the program or data to the CPU 1100 via the RAM 1200. The CPU 1100 loads the program from the recording medium 1800 onto the RAM 1200 via the media interface 1700, and executes the loaded program. Examples of the recording medium 1800 include optical recording media such as a digital versatile disc (DVD) or a phase change rewritable disk (PD), a magneto-optical recording medium such as a magneto-optical disk (MO), a tape medium, a magnetic recording medium, or semiconductor memory.

For example, when the computer 1000 functions as the terminal devices 10 to 40 and the information processing device 100 according to the embodiment, the CPU 1100 of the computer 1000 executes the program loaded on the RAM 1200 so as to implement the functions of the control unit 14 and the control unit 130. Having read the programs from the recording medium 1800, the CPU 1100 of the computer 1000 executes the programs. However, as another example, these programs may be acquired from another device via a predetermined communication network.

13. Others

Furthermore, among individual processing described in the above embodiment and modifications of the present disclosure, all or a part of the processing described as being performed automatically may be manually performed, or the processing described as being performed manually can be performed automatically by known methods. In addition, the processing procedures, specific names, and information including various data and parameters depicted in the above specifications or drawings can be changed in any manner unless otherwise specified. For example, a variety of information illustrated in each of the drawings are not limited to the information illustrated.

In addition, each of components of each device is provided as a functional and conceptional illustration and thus does not necessarily need to be physically configured as illustrated. That is, the specific form of distribution/integration of each of the devices is not limited to those illustrated in the drawings, and all or a part thereof may be functionally or physically distributed or integrated into arbitrary units according to various loads and use situations.

Furthermore, the above-described embodiments and modifications can be appropriately combined within a range implementable without contradiction of processes.

While some of the embodiments of the present application have been described in detail with reference to the drawings, these are merely examples, and the present invention can be implemented in other forms subjected to various modifications and improvements based on the knowledge of those skilled in the art, including the aspects described in the disclosure of the invention.

In addition, the "part (section, module, or unit)" described above can be read as a word such as a "means" and "circuit". For example, the acquisition unit can be read as an acquisition means or an acquisition circuit.

Note that the present technique can also have the following configurations.

(1)

An information processing device comprising:

an acquisition unit that acquires a plurality of pieces of network request information individually transmitted from a plurality of terminal devices used by a user and acquires communication information indicating statuses of a plurality of communication networks usable by the plurality of terminal devices; and a control unit that controls the communication network to be used by each terminal device in accordance with the plurality of pieces of network request information and the communication information.

(2)

The information processing device according to (1), wherein the control unit controls the communication network to be used by each terminal device in accordance with a priority assigned to each terminal device.

(3)

The information processing device according to (2), wherein the control unit restricts use of the communication network by the terminal device with low priority.

(4)

The information processing device according to (2) or (3), wherein the control unit stops use of the communication network by the terminal device with low priority.

(5)

The information processing device according to any one of (2) to (4), wherein the control unit calculates the priority in accordance with attribute information of the user of each terminal device.

(6)

The information processing device according to any one of (2) to (5), wherein the control unit calculates the priority in accordance with billing information of the user of each terminal device.

(7)

The information processing device according to any one of (1) to (6), wherein the plurality of pieces of network request information includes a bandwidth, a traffic characteristic, or a latency requested by each terminal device.

(8)

The information processing device according to any one of (1) to (7), wherein the plurality of pieces of network request information includes position information, the position information being information regarding a position of each terminal device and changing with time.

(9)

The information processing device according to any one of (1) to (8), wherein the plurality of pieces of network request information includes bandwidth information requested by each terminal device, the bandwidth information being information changing with time.

(10)

A terminal device comprising:

a transmission unit that transmits network request information; and a communication control unit that uses a communication network in accordance with instruction information corresponding to the network request information and communication information indicating a status of a usable communication network.

(11)

An information processing method implemented by a computer, comprising:

acquiring a plurality of pieces of network request information individually transmitted from a plurality of terminal devices used by a user and acquiring communication information indicating a status of a communication network usable by the plurality of terminal devices; and controlling the communication network to be used by each terminal device in accordance with the plurality of pieces of network request information and the communication information.

(12)

An information processing program causing a computer to execute:

acquiring a plurality of pieces of network request information individually transmitted from a plurality of terminal devices used by a user and acquiring communication information indicating a status of a communication network usable by the plurality of terminal devices; and controlling the communication network to be used by each terminal device in accordance with the plurality of pieces of network request information and the communication information.

REFERENCE SIGNS LIST

1 INFORMATION PROCESSING SYSTEM
2 5G (Sub6)
3 5G (mmW)
4 4G (LTE)
5 Wi-Fi
10 TERMINAL DEVICE
20 TERMINAL DEVICE
30 TERMINAL DEVICE
40 TERMINAL DEVICE
100 INFORMATION PROCESSING DEVICE
110 COMMUNICATION UNIT
120 STORAGE UNIT
121 NW REQUEST INFORMATION STORAGE UNIT
122 COMMUNICATION INFORMATION STORAGE UNIT
130 CONTROL UNIT
131 ACQUISITION UNIT
132 NW QUALITY MEASUREMENT UNIT
133 PRIORITY CALCULATION UNIT
134 NW SELECTION UNIT
135 INSTRUCTION UNIT
200 EXTERNAL SERVER
N NETWORK

The invention claimed is:

1. An information processing device comprising:

circuitry configured to acquire a plurality of pieces of network request information individually transmitted from a plurality of terminal devices;

acquire communication information indicating statuses of a plurality of communication networks usable by the plurality of terminal devices, the plurality of communication networks usable by the plurality of terminal devices having a total network capacity;

determine whether the total network capacity of the plurality of communication networks satisfies a requested network capacity of a newly acquired network request information acquired from another terminal device different from the plurality of terminal devices; and control the communication network to be used by each of the plurality of terminal devices in accordance with the plurality of pieces of network request information and the communication information based on whether the total network capacity of the plurality of communication networks satisfies the network capacity of the newly acquired network request information, wherein the control of the communication network includes, under a first condition where the total network capacity of the plurality of communication networks satisfies a network capacity of the newly acquired network request information, maintaining use of the communication networks by the plurality of terminal device and selecting one of the communication networks for use by said another terminal device associated with newly acquired network request information, wherein the control of the communication network includes, under a second condition where the total network capacity of the plurality of communication networks does not satisfy the network capacity of the newly acquired network request information, control the communication network to be used by each of the plurality of terminal devices and said another terminal device in accordance with a priority assigned to each of the plurality of terminal devices and said another terminal device, wherein the total network capacity of the plurality of communication networks satisfies the requested network capacity of the newly acquired network request information in a case where the requested network capacity is less than the total network capacity, and wherein the newly acquired network request information includes a requested traffic characteristic in addition to the requested network capacity.

2. The information processing device according to claim 1, wherein the circuitry is further configured to restrict use of the communication network by each said terminal device with calculated priority below a predetermined threshold.

3. The information processing device according to claim 1, wherein the circuitry is further configured to stop use of the communication network by each said terminal device with calculated priority below a predetermined threshold.

4. The information processing device according to claim 1, wherein the circuitry is further configured to calculate the priority in accordance with attribute information of a user of each said terminal device.

5. The information processing device according to claim 1, wherein the circuitry is further configured to calculate the priority in accordance with billing information of a user of each said terminal device.

6. The information processing device according to claim 1, wherein the plurality of pieces of network request information includes a bandwidth, a traffic characteristic, or a latency requested by each said terminal device.

7. The information processing device according to claim 1, wherein the plurality of pieces of network request information includes position information, the position information being information regarding a position of each said terminal device and changing with time.

8. The information processing device according to claim 1, wherein the plurality of pieces of network request information includes bandwidth information requested by each said terminal device, the bandwidth information being information changing with time.

9. An information processing method implemented by a computer, comprising:

acquiring a plurality of pieces of network request information individually transmitted from a plurality of terminal devices used;

acquiring communication information indicating a status of a communication network usable by the plurality of terminal devices, the plurality of communication networks usable by the plurality of terminal devices having a total network capacity;

determining whether the total network capacity of the plurality of communication networks satisfies a network capacity of a newly acquired network request information acquired from another terminal device different from the plurality of terminal devices; and controlling the communication network to be used by each of the plurality of terminal devices in accordance with the plurality of pieces of network request information, the communication information based on whether the total network capacity of the plurality of communication networks satisfies the network capacity of the newly acquired network request information, wherein said controlling the communication network includes, under a first condition where the total network capacity of the plurality of communication networks satisfies a network capacity of the newly acquired network request information, maintaining use of the communication networks by the plurality of terminal device and selecting one of the communication networks for use by said another terminal device associated with newly acquired network request information, wherein said controlling the communication network includes, under a second condition where the total network capacity of the plurality of communication networks does not satisfy the network capacity of the newly acquired network request information, control the communication network to be used by each of the plurality of terminal devices and said another terminal device in accordance with a priority assigned to each of the plurality of terminal devices and said another terminal device, wherein the total network capacity of the plurality of communication networks satisfies the requested network capacity of a newly acquired network request information in a case where the requested network capacity is less than the total network capacity.

10. A non-transitory computer-readable storage medium storing an information processing program that causes the computer to execute the method of claim 9.

* * * * *